United States Patent
Marchya et al.

(10) Patent No.: US 9,883,137 B2
(45) Date of Patent: Jan. 30, 2018

(54) UPDATING REGIONS FOR DISPLAY BASED ON VIDEO DECODING MODE

(71) Applicant: QUALCOMM Incorporated, San Diego, CA (US)

(72) Inventors: Dileep Marchya, San Diego, CA (US); Mastan Manoj Kumar Amara Venkata, San Diego, CA (US); Sudeep Ravi Kottilingal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/931,358

(22) Filed: Nov. 3, 2015

(65) Prior Publication Data

US 2017/0127012 A1     May 4, 2017

(51) Int. Cl.
*H04N 5/915*     (2006.01)
*H04N 5/14*      (2006.01)

(52) U.S. Cl.
CPC ............ *H04N 5/915* (2013.01); *H04N 5/147* (2013.01)

(58) Field of Classification Search
CPC ...................................................... H04N 5/915
USPC ......................................................... 348/441
See application file for complete search history.

(56) References Cited

U.S. PATENT DOCUMENTS

| | | | |
|---|---|---|---|
| 2007/0285500 A1 | 12/2007 | Ma et al. | |
| 2009/0232217 A1 | 9/2009 | Lee et al. | |
| 2010/0086053 A1* | 4/2010 | Okada | H04N 19/105 375/240.16 |
| 2010/0329336 A1* | 12/2010 | Sohn | H04N 19/105 375/240.12 |
| 2013/0156335 A1 | 6/2013 | Lim et al. | |
| 2014/0161175 A1 | 6/2014 | Zhang et al. | |
| 2014/0247866 A1 | 9/2014 | Lee et al. | |
| 2014/0253681 A1 | 9/2014 | Zhang et al. | |
| 2014/0368558 A1* | 12/2014 | Ikeda | G09G 3/3426 345/690 |
| 2015/0092855 A1 | 4/2015 | Chou et al. | |
| 2016/0005344 A1* | 1/2016 | Stine | G09G 3/007 345/428 |
| 2016/0073115 A1 | 3/2016 | Yoon et al. | |
| 2016/0309156 A1 | 10/2016 | Park et al. | |

FOREIGN PATENT DOCUMENTS

| | | |
|---|---|---|
| KR | 20140122195 A | 10/2014 |
| WO | 2015006884 A1 | 1/2015 |
| WO | 2015099506 A1 | 7/2015 |

OTHER PUBLICATIONS

International Search Report and Written Opinion from corresponding PCT Application Serial No. PCT/US2016/050998—ISA/EPO—dated Jan. 18, 2017 (12 pages).
Reply to Written Opinion from corresponding PCT Application Serial No. PCT/US2016/050998 filed on Feb. 22, 2017 (21 pages).

* cited by examiner

*Primary Examiner* — Paulos M Natnael
*Assistant Examiner* — Justin Sanders

(57) ABSTRACT

Techniques are described in which a video decoding mode is used to determine which regions of a picture need to be composed. If a region of a current picture is decoded in skip mode with the reference picture of the skip mode being a previous picture that is displayed immediately prior to the current picture, then pixel values for that region may not need to be retrieved from system memory.

25 Claims, 3 Drawing Sheets

UPDATING REGIONS FOR DISPLAY BASED ON VIDEO DECODING MODE

TECHNICAL FIELD

This disclosure relates to displaying image content, and more particularly, to updating image content to be displayed.

BACKGROUND

A video decoder decodes video data to generate pictures that are to be displayed and stores the generated picture in a video buffer. A display processor retrieves the image content of the generated pictures from the video buffer and composes the image content for display.

SUMMARY

In general, the disclosure describes techniques for identifying regions of a current picture that changed relative to an immediately previous picture so that only the regions of the current picture that changed are retrieved from a system memory by a display processor for composition. For identifying regions of the current picture that changed, processing circuitry identifies which regions of the current picture were generated by copying pixel values of co-located regions of the previous picture that is displayed immediately prior to the current picture. The display processor may not retrieve the regions of the current picture that are determined to have been copied from co-located regions of the previous picture that is displayed immediately prior to the current picture.

In one example, the disclosure describes a method of composing images for display, the method comprising identifying, with processing circuitry, one or more first regions in a current picture that were generated by copying pixel values of one or more respective co-located regions in a previous picture that is displayed immediately prior to the current picture, identifying, with the processing circuitry, second regions of the current picture that changed relative to the previous picture based on the one or more identified first regions in the current picture, and providing, with the processing circuitry, instructions to a display processor to retrieve pixel values of the identified second regions of the current picture that changed relative to the previous picture from a system memory, and no pixel values for the one or more first regions from the system memory, for composing the current picture with one or more layers of image content to generate a composed image.

In one example, the disclosure describes a device for composing images for display, the device comprising a display processor, a system memory configured to store a previous picture that is displayed immediately prior to a current picture, and processing circuitry. The processing circuitry is configured to identify one or more first regions in the current picture that were generated by copying pixel values stored in the system memory of one or more respective co-located regions in the previous picture that is displayed immediately prior to the current picture, identify second regions of the current picture that changed relative to the previous picture based on the one or more identified first regions in the current picture, and provide instructions to the display processor to retrieve pixel values of the identified second regions of the current picture that changed relative to the previous picture from the system memory, and no pixel values for the one or more first regions from the system memory, for composing the current picture with one or more layers of image content to generate a composed image.

In one example, the disclosure describes a device for composing images for display, the device comprising means for identifying one or more first regions in a current picture that were generated by copying pixel values of one or more respective co-located regions in a previous picture that is displayed immediately prior to the current picture, means for identifying second regions of the current picture that changed relative to the previous picture based on the one or more identified first regions in the current picture, and means for providing instructions to a display processor to retrieve pixel values of the identified second regions of the current picture that changed relative to the previous picture from a system memory, and no pixel values for the one or more first regions from the system memory, for composing the current picture with one or more layers of image content to generate a composed image.

In one example, the disclosure describes a computer-readable storage medium having instructions stored thereon that when executed cause one or more processors of a device for composing images for display to identify one or more first regions in a current picture that were generated by copying pixel values of one or more respective co-located regions in a previous picture that is displayed immediately prior to the current picture, identify second regions of the current picture that changed relative to the previous picture based on the one or more identified first regions in the current picture, and provide instructions to a display processor to retrieve pixel values of the identified second regions of the current picture that changed relative to the previous picture from a system memory, and no pixel values for the one or more first regions from the system memory, for composing the current picture with one or more layers of image content to generate a composed image.

The details of one or more examples are set forth in the accompanying drawings and the description below. Other features, objects, and advantages will be apparent from the description, drawings, and claims.

DETAILED DESCRIPTION

Figure 1:
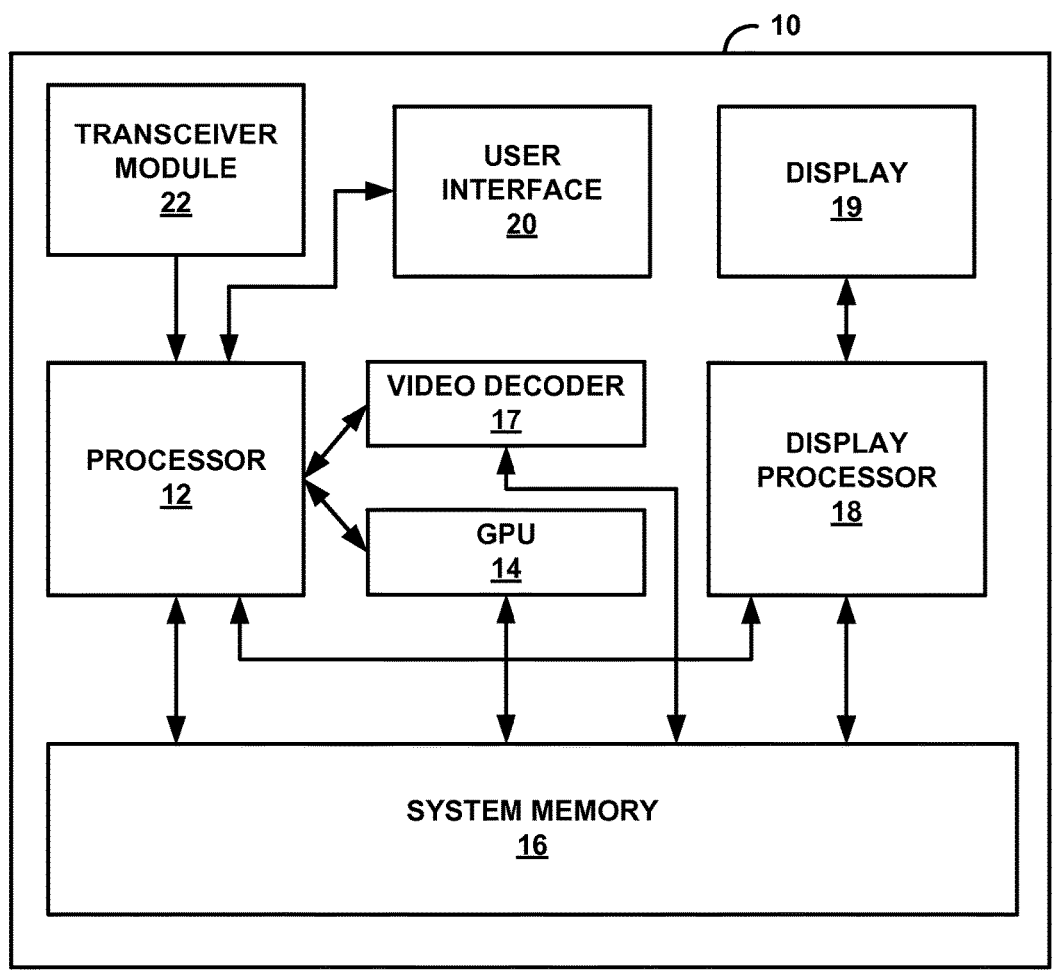
FIG. 1 is a block diagram illustrating an example device for image composition and display in accordance with one or more example techniques described in this disclosure.

Various applications executing on a processor, as well as operating system level operations, create image content for display. As an example, an application executing on the processor may generate image content for the current date and time, another application executing on the processor may generate image content for the background and/or edges of a display, another application executing on the processor may generate image content for indicating an audio volume level, and so forth. As additional examples, a video decoder may decode video data for display in at least a portion of an image frame. Other examples exist, and the techniques are generally related to various examples in which image content is generated for display.

Each of the generated image contents may be considered as a separate layer, and a system memory may include a layer buffer that stores each of the layers. For example, a video decoder parses video data in a bitstream to reconstruct video pictures that are displayed. The video pictures generated by the video decoder form a video layer in a layer buffer. The processor may instruct a display processor (e.g., provide instructions to a display processor) to retrieve the video layer and other layers (e.g., a user interface layer constructed by a graphics processing unit (GPU)) from the layer buffer and compose the layers together to form the composed image (i.e., a composite image that combines the layers) that the display processor displays. However, in some cases, the display processor may not have sufficient resources to perform the composition, and shares the composition tasks with other components such as the GPU.

Although other units such as the GPU may assist with composition, from a processing efficiency and proper resource utilization perspective, it may be beneficial for the display processor to perform the composition so that other units can perform their respective functions (e.g., so that clock cycles are not wasted by the GPU to perform composition tasks while other GPU tasks are delayed). One way to ensure that the display processor performs the composition, instead of sharing the task with other components, is to limit the amount of area that needs to be composed.

For example, if only some of the image content of a picture changed from a previous picture, it may beneficial for the display processor to retrieve only the changed image content for the picture and reuse the image content of the previous picture for the other portions. In other words, one way to reduce the amount of data the display processor needs to retrieve is to determine the regions that changed from one picture to the next, and have the display processor only retrieve image content for the determined regions that changed. In general, reducing the amount of data that the display processor needs to retrieve increases processing efficiencies because less power is needed to retrieve the data. Also, since there is less data to process, the display processor may be able to compose the image faster.

This disclosure describes example techniques to leverage the video decoder to assist in determining regions that change from one picture to the next, and this information is used to instruct the display processor about which region's pixel values to retrieve from system memory and which region's pixel values can be retrieved from local memory. Video decoding includes a skip mode. In the skip mode, the video content for a block (e.g., pixel values for a block) in the current picture is copied from a block in an earlier decoded picture. If this earlier decoded picture, identified for the skip mode, is also the picture that is displayed immediately prior to when the current picture is displayed, then the macroblock in the current picture for which the skip mode is enabled is not a region having image content that changed. In this case, the region that forms the residual between all blocks of the current picture and blocks for which skip mode is enabled in the immediately preceding picture in display order is the region having image content that changed. The display processor utilizes this information concerning the region that forms the residual to reduce the amount of data it needs to retrieve.

The residual refers to the difference between pixel values, which may be difference in the red-green-blue (RGB) values or difference in the luminance and chrominance values. There is no residual for a block that is coded in skip mode because the pixel values for the block are copied from another block (i.e., no difference in pixel values is determined between the block and the earlier block).

In some cases, an entire picture may not have changed from the immediately preceding picture in display order because the entire picture is in skip mode using corresponding macroblocks in the immediately preceding picture in display order. In this case, the amount of data that needs to be retrieved by the display processor is further reduced. For such examples, the display processor may utilize the entirety of the previous picture as the current picture, and not retrieve any image content for the current picture.

The example techniques described in this disclosure are described as being performed by processing circuitry. One example of the processing circuitry that performs the example techniques is a processor, such as a central processing unit (CPU). For instance, the CPU may determine which portions of a current picture changed relative to an immediately preceding picture in display order based on which regions of the current picture were decoded in skip mode using the image content of the immediately preceding picture in display order. The CPU may then instruct (e.g., provide instructions to) the display processor as to the image content the display processor needs to retrieve based on the determination of which portions of the current picture changed.

However, the techniques are not so limited. In some examples, the display processor or some other processing unit may perform the techniques described in this disclosure, and in such examples, the processing circuitry may include the display processor or one or more of these other processing units. The processing circuitry may also refer to a combination of the processor (e.g., CPU) and the display processor. Accordingly, the term "processing circuitry" is used to generally refer to integrated circuitry components that perform the example techniques and may include the processor (CPU, application processor, or GPU), the display processor, a combination of the two, or some other combination of components. The processing circuitry could be a general purpose programmable processor, special purpose logic circuitry, or combination of both.

FIG. 1 is a block diagram illustrating an example device for image display in accordance with one or more example techniques described in this disclosure. FIG. 1 illustrates device 10, examples of which include, but are not limited to, video devices such as media players, set-top boxes, wireless handsets such as mobile telephones (e.g., so-called smartphones), personal digital assistants (PDAs), desktop computers, laptop computers, gaming consoles, video conferencing units, tablet computing devices, digital kiosks, digital signs and the like.

In the example of FIG. 1, device 10 includes processor 12, graphics processing unit (GPU) 14, system memory 16, video decoder 17, display processor 18, display 19, user interface 20, and transceiver module 22. In examples where device 10 is a mobile device, display processor 18 is a mobile display processor (MDP). In some examples, such as examples where device 10 is a mobile device, processor 12, GPU 14, video decoder 17, and display processor 18 may be formed as an integrated circuit (IC). For example, the IC may be considered as a processing chip within a chip package, and may be a system-on-chip (SoC). In some examples, two or more of processors 12, GPU 14, video decoder 17, and display processor 18 may be housed together in the same IC and the other or others in a different integrated circuit (i.e., different chip packages) or all four may be housed in different ICs or on the same IC.

Examples of processor 12, GPU 14, video decoder 17, and display processor 18 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks). Display processor 18 may also be specialized integrated circuit hardware that is designed to retrieve image content from system memory 16, compose the image content into an image frame, and output the image frame to display 19.

Video decoder 17 may be specialized integrated circuit hardware or hardware executing software, or a combination thereof. In either case, video decoder 17 is configured to decode video data. For example, video decoder 17 may receive a bitstream that video decoder 17 parses to determine the manner in which to decode a picture. Video decoder 17 may decode the video data to generate a picture for display. The picture may form one of the layers to be composed for presentation on a display.

Processor 12 may execute various types of applications. Examples of the applications include web browsers, e-mail applications, spreadsheets, word processing applications, video games, or other applications that generate viewable objects for display. In some examples, processor 12 may execute applications to generate video content for televisions, movies, or other viewing applications. System memory 16 may store instructions for execution of the one or more applications. The execution of an application on processor 12 causes processor 12 to produce graphics data for image content that is to be displayed. Processor 12 may transmit graphics data of the image content to GPU 14 for further processing based on and instructions or commands that processor 12 transmits to GPU 14.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12, GPU 14, video decoder 17, and/or display processor 18 to perform the functions ascribed in this disclosure to processor 12, GPU 14, video decoder 17, and/or display processor 18. Accordingly, system memory 16 may be a computer-readable storage medium having instructions stored thereon that, when executed, cause one or more processors (e.g., processor 12, GPU 14, video decoder 17, and/or display processor 18) to perform various functions.

System memory 16 is a non-transitory storage medium. The term "non-transitory" indicates that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

System memory 16 is external to processor 12, video decoder 17, GPU 14, and display processor 18. For example, processor 12, video decoder 17, GPU 14, and display processor 18 may utilize a bus to communicate with system memory 16, where this bus is shared by the various components of device 10. System memory 16 should not be confused with a local memory of processor 12, video decoder 17, GPU 14, and display processor 18. For example, the local memory of display processor 18 is accessible by components of display processor 18 without needing to access the bus that connects to system memory 16. The local memory provides quick access, whereas accessing via system memory 16 may be slower. In some examples, processor 12, video decoder 17, GPU 14, and display processor 18 may share a common local memory, but the example techniques are not so limited.

In the techniques described in this disclosure, processor 12 may instruct GPU 14 to render graphical image content. For instance, an application executing on processor 12 may generate graphical image content for a wallpaper (e.g., background) to be displayed, another application executing on processor 12 may generate graphical image content to indicate the time of day, another application executing on processor 12 may generate graphical image content to indicate wireless signal strength (e.g., for a device supporting wireless communication such as a smartphone, tablet, computer, television, gaming console or the like), and so forth. A framework of processor 12 (e.g., a software module executing on processor 12, hardware on processor 12, or a combination thereof) may instruct GPU 14 to render the graphical image content generated by each of these applications. One example of the framework of processor 12 may be the operating system (OS) executing on processor 12.

In turn, GPU 14 renders the graphical image content generated by each of these applications. For example, the respective graphical image content from respective applications may be considered as respective layers. Keeping with the above example, one layer is the wallpaper, another layer is the time information, another layer is wireless signal strength, and so forth. GPU 14 may store the resulting layers in a layer buffer in system memory 16.

In addition to GPU 14, video decoder 17 also generates image content (e.g., pictures) that is to be displayed. The pictures that video decoder 17 generates form a video layer in the layer buffer. To generate pictures of the video layer, video decoder 17 generally reconstructs the picture block-by-block, i.e., by reconstructing multiple blocks that form portions of the overall picture, but it may be possible for video decoder 17 to reconstruct a full picture directly in some cases. Video decoder 17 implements various decoding modes on the blocks, such as inter-prediction decoding and intra-prediction decoding, to reconstruct the block. In addition to inter-prediction and intra-prediction, video decoder 17 may implement a skip mode for reconstructing one or more blocks of a picture.

If a block is to be decoded in skip mode, a video encoder may include a syntax element in an encoded video bitstream to indicate the skip mode for the block or for a larger region that includes the block. Video decoder 17 parses the bitstream that includes the video data that is used to generate the pictures and determines that the syntax element indicating whether skip mode is enabled indicates that skip mode is enabled for the block. In addition, video decoder 17 determines a reference picture for the block that is to be decoded in skip mode. The syntax element that the video encoder uses to indicate that the block is encoded in skip mode may be a one-bit flag or part of a multi-bit syntax element. The indication of skip mode coding may be block-by-block, slice-by-slice, or frame-by-frame and may be preformed in accordance with existing video coding standards (e.g., H.264 or H.265) but the techniques are not limited to any particular video coding standard or limited to video coding that is based on a standard.

Video decoder 17 copies the pixel values of a co-located block (e.g., in the same position), as the block that is to be decoded, from the reference picture. In this example, after decoding, the block has the same pixel values as the co-located block in the reference picture. As described in more detail, the examples described in this disclosure utilize information indicating whether a block is skip-mode decoded for determining which regions display processor 18 needs to retrieve from system memory 16 for composing.

Display processor 18 may retrieve the respective layers from the layer buffer in system memory 16 and compose the layers to form a single image frame. Display processor 18 may then output the image frame to display 19. In addition, display processor 18 may store the composed image frame in a local memory of display processor 18 or a local memory of display 19.

Composing of the layers may be considered as stitching the layers together or otherwise combining the layers to form one image. The layers may be displayed on top of one another (e.g., based on a z-level hierarchy) where one layer partially or fully occludes another layer. As an example, GPU 14 may output graphics content of a user interface for controlling a video playback (e.g., fast-forward button, pause button, etc.), and video decoder 17 may generate pictures for the video playback. In this example, the user interface may be one layer and the pictures in the video playback are another layer. Display processor 18, as part of the composing, may cover a portion of the pictures in the video playback with the user interface, i.e., such that the user interface appears to be overlaid on the picture.

In general, display processor 18 is well suited for image composition. However, display processor 18 may need to retrieve a relatively large amount of image content data from system memory 16 for composing. Retrieving such a relatively large amount of data negatively impacts memory bandwidth because the bus that interconnects components of device 10 is clogged by transferring this large amount of data, which in turn causes other components of device 10 to be delayed in performing respective functions. Furthermore, image composition may be delayed if display processor 18 has to compose a relatively large amount of image content.

One way to limit the amount of image content data that display processor 18 needs to retrieve is to have display processor 18 only retrieve those portions of layers that changed relative to an immediately preceding composed image. For the rest of the portions, display processor 18 reuses the image content of the immediately preceding composed image, i.e., in display order. For example, for the rest of the portions, display processor 18 retrieves the pixel values from local memory.

For instance, display processor 18 may be configured compose layers to generate composed images that can be displayed at a particular rate (e.g., 30 frames-per-second, 15 frames-per-second, etc.). However, not all image content changes from one display instance to the next. In other words, some image content stays the same from composed image-to-composed image. If image content does not change, display processor 18 may reuse the image content from the previously composed image rather than needlessly retrieving this image content that did not change from system memory 16.

As an example, the background wallpaper layer does not generally change from one composed image to the next composed image. In this case, display processor 18 may not need to retrieve the image content of the background wallpaper every time display processor 18 performs composition to generate a composed image. Rather, display processor 18 may reuse portions of the background wallpaper that did not change from one composed image to the next.

In some cases, processor 12 may be able to determine all of the regions within the layers that changed from one composed image to the next, and cause display processor 18 to (e.g., provides instructions to display processor 18 to) retrieve image content (e.g., pixel values) for only the determined regions that changed. A region whose image content changes from one composed image to the next may be referred to as a dirty region. For brevity, regions within layers that changed from one composed image to the next are referred to as DRs (dirty regions).

For example, processor 12 may determine a union of regions of respective layers that changed from one composed image to the next as an updating region. For instance, processor 12 may determine that updating region=union (DR of all layers). The union operation results in a combined area of all of the regions in respective layers that changed relative to an immediately preceding composed image. Processor 12 may then provide instructions to display processor 18 to retrieve image content of only the updating region, and of no other region, and cause display processor 18 to compose. For example, if display 19 were a command mode panel (e.g., so-called smart panel), display processor 18 may be able to compose only the updating region.

Processor 12 may be able to determine the regions of image content generated by GPU 14 that changed relative to an immediately preceding composed image based on commands generated in accordance with the OpenGL API. For instance, if processor 12 is instructing GPU 14 in accordance with the OpenGL API, then processor 12 may utilize the instructions to GPU 14 to determine which regions of layers changed.

However, video decoder 17 may not be configured to output information indicating whether a region in a current picture changed relative to a previous picture that immediately precedes the current picture in display order (i.e., the current picture is the immediate next picture that is displayed after the previous picture). For example, it is possible that a region in a current picture is an identical copy of a co-located region in a previous picture that immediately precedes the current picture.

If video decoder 17 provides no information that processor 12 can use to determine whether a region in the video layer changed from one composed image to the next composed image, processor 12 causes display processor 18 to (e.g., provides instructions to display processor 18 to) retrieve the entire video layer (i.e., a video layer is always considered as a full updating layer). However, in this case the video layer may not have changed from one composed image to the next, but processor 12 still causes display processor 18 to retrieve the entire video layer.

In some cases, such as stationary or low motion video, the updating region may be relatively small. Processor 12 always causing display processor to refresh a full video layer (e.g., recompose a picture) in such cases leads to inefficient utilization of hardware resources, especially for battery operated examples of device 10, and especially while device 10 is playing high resolution content, such as HD/2 k/4 k resolution content.

In the example above, one or more regions of a picture may have the same image content as one or more co-located regions of the immediately preceding picture. In some examples, the entire picture may be a copy of the immediately preceding picture in display order. For such pictures, providing instructions to display processor 18 to retrieve the picture that is a copy of the immediately previous picture is a computational waste.

In the techniques described in this disclosure, processor 12 may determine whether video decoder 17 generated one or more regions in a current picture by copying pixel values of one or more respective co-located regions in a previous picture that is displayed immediately prior to the current picture. As one example, video decoder 17 may be configured (e.g., by updating software of video decoder 17 if necessary) to output information indicating which blocks (e.g., regions) of the current picture are decoded in skip mode and output information indicating the reference picture for these blocks. If processor 12 determines based on the outputted information that the blocks in the current picture were decoded in skip mode with the reference picture being the previous picture that immediately precedes the current picture in display order, processor 12 may determine that these regions did not change from one picture to the next. There may be other ways for processor 12 to determine which blocks were decoded using skip mode where the reference picture is the immediately preceding picture. Also, processor 12 may perform similarly for the case where the entire current picture is decoded in skip mode with the reference picture being the immediately preceding picture in display order. In this way, processor 12 may identify one or more first regions in a current picture that were generated by copying pixel values of one or more respective co-located regions in a previous picture that is displayed immediately prior to the current picture.

Processor 12 may also determine which regions of the current picture changed relative to the previous picture based on the determination of the one or more regions in the current picture that video decoder 17 generated by copying pixel values of one or more respective co-located regions in the previous picture that is displayed immediately prior to the current picture. In other words, processor 12 may identify second regions of the current picture that changed relative to the previous picture based on the one or more identified first regions in the current picture.

For example, processor 12 may determine that all regions of the current picture are not decoded using skip mode, and therefore provide instructions to display processor 18 to retrieve pixel values for the entire picture from system memory 16. As another example, processor 12 may determine that blocks are decoded using skip mode, but also determine that the reference picture for the skip mode coded blocks is not the immediately preceding picture in display order, and therefore provide instructions to display processor 18 to retrieve pixel values of such blocks from system memory 16. In each case, the blocks that are not skip mode encoded and the blocks that are skip mode encoded but have a reference picture that is not the immediately preceding picture in display order form regions of the current picture that can be considered to have changed relative to the immediately preceding picture.

Processor 12 may provide instructions to display processor 18 to retrieve pixel values of the identified second regions of the current picture that changed relative to the previous picture from system memory 16, and no pixel values for the one or more first regions from system memory 16 (e.g., the skip-mode decoded regions with immediately preceding picture), for composing the current picture with one or more layers of image content to generate a composed image. As an example, processor 12 may provide instructions to display processor 18 to retrieve image content of the identified regions of the current picture that changed from a layer buffer and no other regions of the current picture.

In some examples, processor 12 may identify an updating region based on a union of the identified second regions of the current picture that changed relative to the previous picture and respective regions of the one or more layers of image content having image content that changed relative to a previous composed image that is displayed immediately prior to the display of the composed image. In these examples, processor 12 may provide instructions to display processor 18 to compose the identified updating region.

Processor 12 may then provide instructions to display processor 18 to display the composed image on display 19. For example, processor 12 may cause display processor 18 to compose the retrieved image content of the determined regions with the one or more layers of image content to generate the composed image.

The above examples are described as being performed by processor 12. However, the techniques described in this disclosure are not so limited. For example, in some examples, display processor 18 may be configured to perform the example techniques described with respect to processor 12, as well as the techniques described with respect to display processor 18. For instance, display processor 18 may cause itself to compose only the updating region that is the union of the determined regions of the current picture that changed relative to the previous picture and respective regions of the one or more layers of image content having image content or position that changed relative to a previously composed image that is displayed immediately prior to the display of the composed image.

In addition to processor 12 and/or display processor 18 performing these example techniques, it may be possible for other components of device 10 to implement one or more examples described above. Accordingly, in this disclosure the term "processing circuitry" is used to describe components that may implement example techniques described in this disclosure. Examples of the processing circuitry include processor 12, display processor 18, video decoder 17, GPU 14, or any combination of these components.

For instance, in some cases where processing circuitry is limited to processor 12, display processor 18 may be different than the processing circuitry (but it is possible that display processor 18 is still housed in the same chip as processor 12). In examples where display processor 18 implements examples described above with respect to processor 12, or processor 12 and display processor 18 together implement the example techniques described above with respect to processor 12, the processing circuitry includes display processor 18.

Device 10 may also include display 19, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 19 may be external to device 10 in examples where device 10 is a desktop computer. As another example, user interface 20 may be part of display 19 in examples where display 19 is a touch-sensitive or presence-sensitive display of a mobile device or other computing device.

Display 19 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 19. Transceiver module 22 may include circuitry to allow wireless or wired communication between device 10 and another device or a network. Transceiver module 22 may include modulators, demodulators, amplifiers and other such circuitry for wired or wireless communication.

Figure 2:
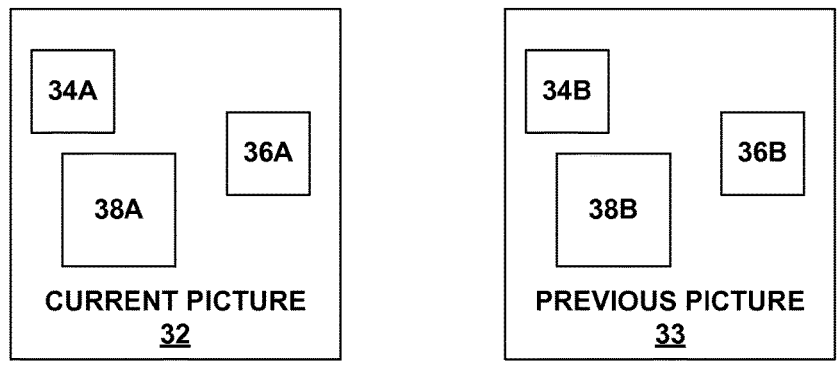
FIG. 2 is a conceptual diagram illustrating an example of a current picture having regions decoded in skip mode.

FIG. 2 is a conceptual diagram illustrating an example of a current picture having regions decoded in skip mode. FIG. 2 illustrates current picture 32 and previous picture 33. In this example, previous picture 33 was decoded by video decoder 17 prior to when video decoder 17 decoded current picture 32. Also, in the techniques described in this disclosure, current picture 32 is a fully decoded picture (e.g., the decoding process on all of current picture 32 is complete). Current picture 32 is now in the process of being displayed, not decoded. In this example, previous picture 33 is the picture that is displayed immediately prior to current picture 32 (e.g., previous picture 33 is a previous picture that immediately precedes current picture 32 in display order). System memory 16 may include a buffer that stores previous picture 32 that is displayed immediately prior to current picture 32.

Current picture 32 includes region 34A, region 36A, and region 38A. Regions 34A, 36A, and 38A may be individual blocks (e.g., macroblocks) of current picture 32 or a group of blocks of current picture 32. Previous picture 33 includes respective co-located region 34B, region 36B, and region 38. Region 34A is co-located with region 34B because region 34A is in the same position within current picture 32 that region 34B is within previous picture 33. The same applies to regions 36A, 36B and regions 38A, 38B.

If regions 34A, 36A, and 38A were each decoded by video decoder 17 in skip mode with the reference picture being previous picture 33, then the pixel values (e.g., luma and chroma values or RGB values) of region 34A are copies of the corresponding pixel values of region 34B, and the same applies to regions 36A, 36B and regions 38A, 38B. In this case, processor 12 may identify regions 34A, 36A, and 38A in current picture 32 as being generated by copying pixel values of one or more respective co-located regions 34B, 36B, and 38B in previous picture 33 that is displayed immediately prior to current picture 32. In this example, regions 34B, 36B, and 38B may be considered as one or more first regions.

Processor 12 may identify second regions of current picture 32 that changed relative to previous picture 33 based on the one or more identified first regions (e.g., one or more regions 34A, 36A, and 38A) in current picture 32. For example, processor 12 may determine that all regions in current picture 32, other than 34A, 36A, and 38A, changed relative to their co-located regions in previous picture 33. Processor 12 may provide instructions to display processor 18 to retrieve pixel values of the identified second regions (e.g., all regions but 34A, 36A, and 38A) of the current picture that changed relative to the previous picture from system memory 16, and no pixel values for the one or more first regions (e.g., regions 34A, 36A, and 38A) from system memory 16, for composing the current picture with one or more layers of image content to generate a composed image.

In some examples, display processor 18 retrieves the pixel values for the one or more identified first regions from local memory (e.g., cache, registers, etc. of display processor 18). For example, after composition, display processor 18 stores the composed image in local memory. In this case, during composition of the current picture, for the pixel values of the one or more identified first regions, display processor 18 is able to retrieve their pixel values from the local memory rather than from system memory 16. For example, processor 12 may provide instructions to display processor 18 to retrieve pixel values of the identified second regions of the current picture that changed from a layer buffer in system memory 16. In addition, processor 12 may provide instructions to display processor 18 to retrieve pixel values of the one or more first regions from a local memory of display processor 18 (which may include memory of display 19).

Processor 12 may also provide instructions to display processor 18 to output information used to display the composed image on display 19. For example, display processor 18 may output values to display 19 that cause pixels on display 19 to illuminate at different colors. The illumination of the pixels on display 19 may be based on the output values determined by display processor 18 based on the pixel values of the composed image.

Figure 3:
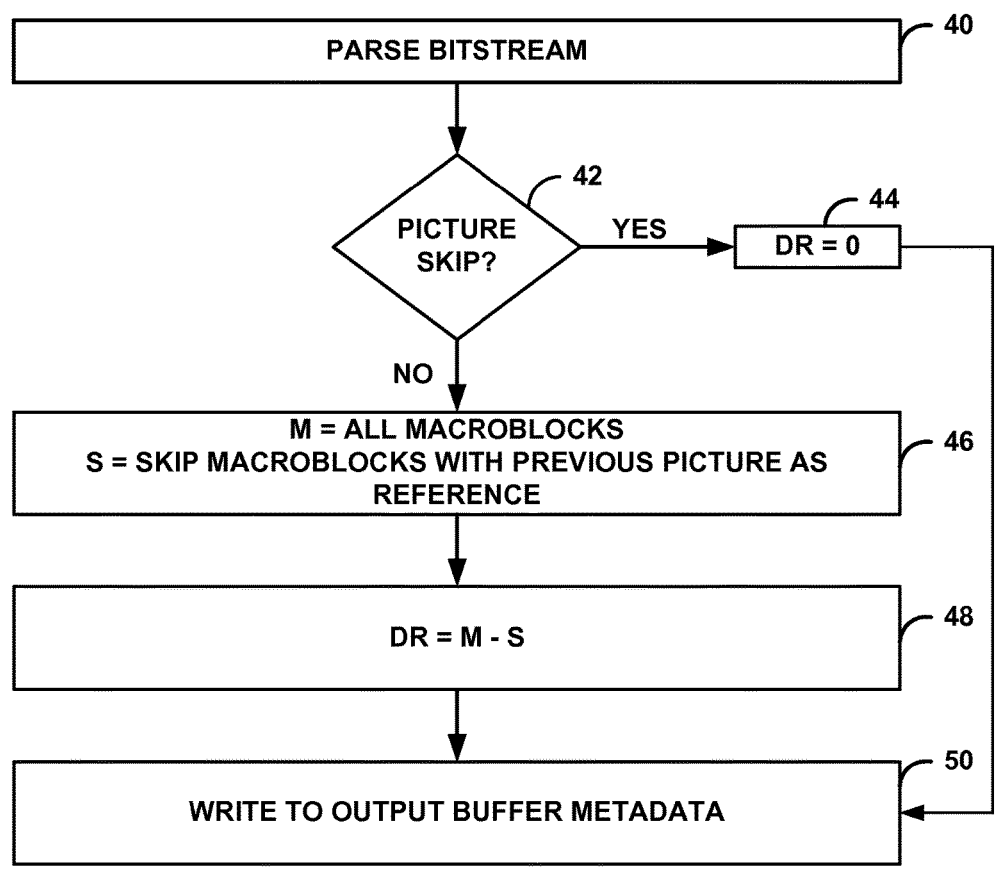
FIG. 3 is a flowchart illustrating an example technique for determining which regions are to be composed.

FIG. 3 is a flowchart illustrating an example technique for determining which regions are to be composed. Video decoder 17 may parse the bitstream to determine whether the syntax element indicating whether a block or picture or group of blocks is to be skip-mode decoded indicates that the block or picture or group of blocks is to be skip-mode decoded (40). Video decoder 17 may output to processor 12 information indicating whether a block or picture or group of blocks is skip-mode decoded and further indicating its reference picture. In some examples, rather than outputting information for every skip-mode decoded block or blocks, video decoder 17 may output to processor 12 information indicating that a block or blocks was decoded in skip-mode only when the reference picture is the immediately preceding picture in display order.

In this example, if processor 12 determines that the entire picture was decoded in skip mode (YES of 42), processor 12 may determine that no image content of current picture 32 changed relative to previous picture 33. In other words, processor 12 may determine that there is no dirty region in current picture 32 (44). Processor 12 may write to output buffer metadata (e.g., in system memory 16 or local memory of processor 12) indicating that current picture 32 is decoded in its entirety in skip mode so that processor 12 may later use this information to instruct display processor 18 as to the layers and image content that display processor 18 is to retrieve from system memory 16 for composition (50).

If processor 12 identifies that some blocks, but not all blocks, of current picture 32 are skip-mode decoded (YES of 42), processor 12 may identify the total number of blocks (M) in current picture 32 and the blocks (S) in current picture 32 that are skip-mode decoded with the reference picture being the immediately prior picture in display order (46).

In this example, processor 12 may subtract S from M to identify which regions of current picture 32 changed relative to previous picture 33 (48). Processor 12 may write to output buffer metadata (e.g., in system memory 16 or local memory of processor 12) that M-S regions of current picture 32 changed relative to previous picture 33 so that processor 12 may later use this information to instruct display processor 18 as to the layers and image content display processor 18 is to retrieve from system memory 16 for composition (50).

Figure 4:
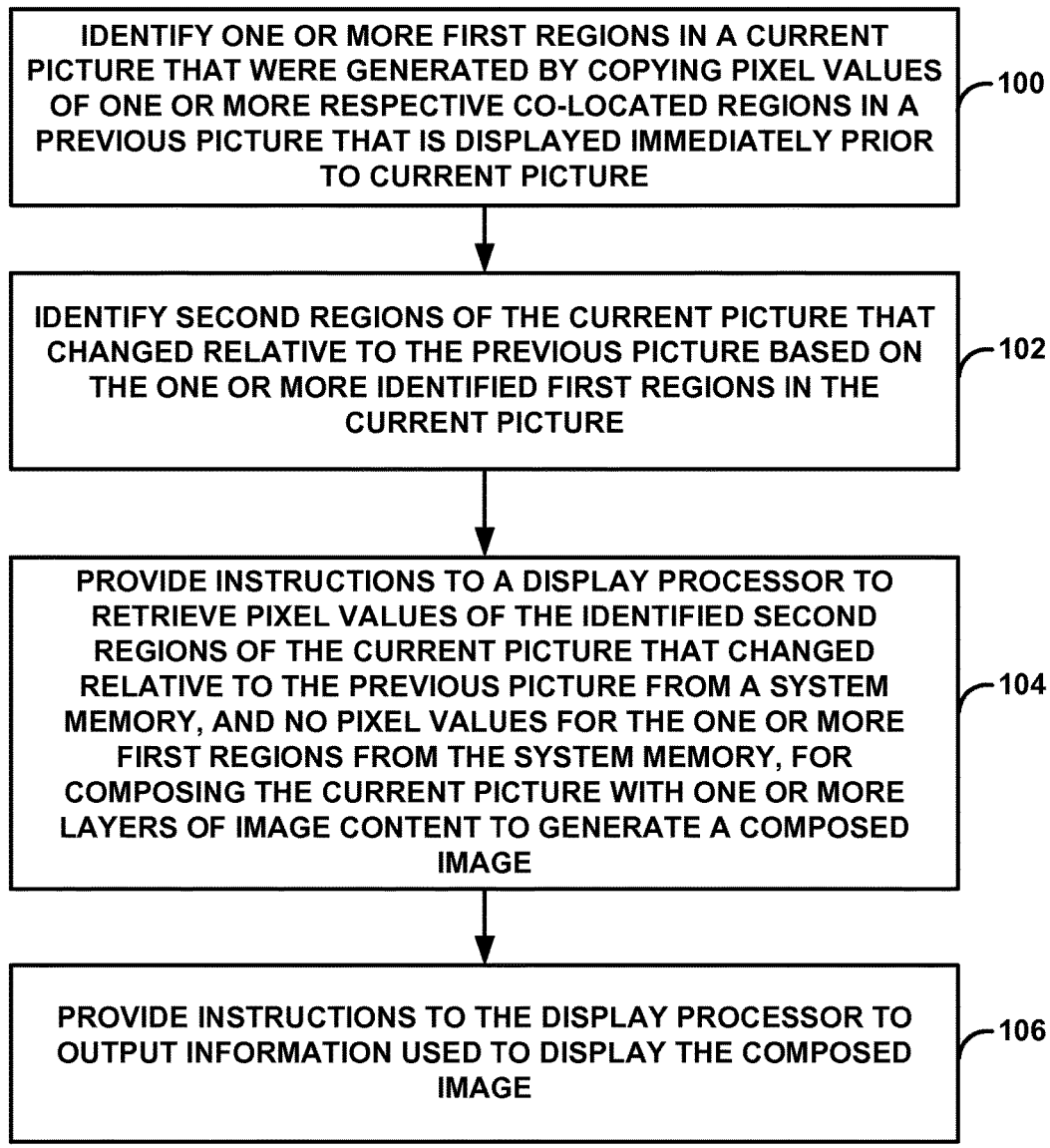
FIG. 4 is a flowchart illustrating an example technique for image composition and display in accordance with this disclosure.

FIG. 4 is a flowchart illustrating an example technique for image composition and display in accordance with this disclosure. For ease, the disclosure is described with respect to processing circuitry, examples of which include any one of or any combination of processor 12, display processor 18, video decoder 17, or GPU 14.

The processing circuitry may be configured to identify one or more first regions (e.g., regions 34A, 36A, and 38A) in current picture 32 that were generated by copying pixel values stored in system memory 16 of one or more respective co-located regions 34B, 36B, and 38B in previous picture 33 that is displayed immediately prior to current picture 32 (100). The processing circuitry may identify second regions of current picture 32 that changed relative to previous picture 33 based on the determination of the one or more first regions (e.g., regions 34A, 36A, and 38A) in current picture 32 (102).

The processing circuitry may provide instructions to display processor 18 to retrieve pixel values of the identified second regions of the current picture that changed relative to the previous picture from system memory 16, and no pixel values for the one or more first regions from system memory 16 (e.g., as these are to be retrieved from local memory), for composing the current picture with one or more layers (e.g., user-inter layer, background layer, etc.) of image content to generate a composed image (104). In this way, the amount of data that needs to be retrieved from system memory 16 may be reduced, as some of the data is being retrieved from local memory which consumes less power and may require less time. The processing circuitry may provide instructions to display processor 18 to output information used to display the composed image (106).

In some example, the processing circuitry is configured to identify an updating region based on a union of the determined regions 34A, 36A, and 38A of current picture 32 that changed relative to previous picture 33 and respective regions of the one or more layers of image content having image content that changed relative to a previous composed image that is displayed immediately prior to the display of the composed image. In these examples, the processing circuitry may provide instructions to display processor 18 to compose the identified updating region.

Furthermore, for memory bandwidth saving purposes, the processing circuitry may cause display processor 18 to retrieve image content of the determined regions 34A, 36A, and 38A of current picture 32 that changed from the layer buffer and no other regions of current picture 32. In these examples, the processing circuitry may cause display processor 18 to compose the retrieved image content of the determined regions 34A, 36A, and 38A with the one or more layers of image content to generate the composed image.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of composing images for display, the method comprising:

reconstructing at least a portion of a current picture based on pixel values of a previous picture that is displayed immediately prior to the current picture, wherein reconstructing comprises generating one or more first regions in the current picture by copying pixel values of one or more respective co-located regions in the previous picture that is displayed immediately prior to the current picture;

subsequent to reconstructing the current picture, identifying, with processing circuitry and based on decoding modes that were used for reconstructing the current picture, the one or more first regions in the current picture that were generated by copying the pixel values of the one or more respective co-located regions in the previous picture that is displayed immediately prior to the current picture;

subsequent to reconstructing the current picture, identifying, with the processing circuitry, one or more second regions of the current picture that changed relative to the previous picture based on the identified one or more first regions in the current picture; and providing, with the processing circuitry, instructions to a display processor to retrieve pixel values of the identified one or more second regions of the current picture that changed relative to the previous picture from a system memory, and no pixel values for the identified one or more first regions from the system memory, for composing the current picture with one or more layers of image content to generate a composed image.

2. The method of claim 1, further comprising:
providing instructions to the display processor to output information used to display the composed image.

3. The method of claim 1, further comprising:
identifying an updating region based on a union of the identified one or more second regions of the current picture that changed relative to the previous picture and respective regions of the one or more layers of image content having image content that changed relative to a previous composed image that is displayed immediately prior to the display of the composed image; and
providing instructions to the display processor to compose the identified updating region.

4. The method of claim 1, wherein the current picture comprises a first picture, the method further comprising:
determining that an entirety of a second picture was generated by copying pixel values of a third picture that is displayed immediately prior to the second picture;
in response to determining that the entirety of the second picture was generated by copying pixel values, providing instructions to the display processor to compose the second picture with the one or more layers of image content without retrieving any pixel values for the second picture from the system memory.

5. The method of claim 1, wherein providing instructions to the display processor to retrieve pixel values comprises providing instructions to the display processor to retrieve pixel values of the identified one or more second regions of the current picture that changed from a layer buffer in the system memory, the method further comprising:
providing instructions to the display processor to retrieve pixel values of the identified one or more first regions from a local memory of the display processor.

6. The method of claim 1, wherein identifying the one or more first regions in the current picture that were generated by copying pixel values of the one or more respective co-located regions in the previous picture that is displayed immediately prior to the current picture comprises:

determining that the one or more first regions in the current picture were decoded in a skip mode; and
determining that a reference picture for the skip mode was the previous picture that is displayed immediately prior to the current picture.

7. The method of claim 1, wherein the processing circuitry includes the display processor.

8. The method of claim 1, further comprising composing, with the display processor, the identified one or more second regions with the one or more layers of image content to generate the composed image by stitching the identified one or more second regions with the image content of the one or more layers of image content.

9. A device for composing images for display, the device comprising:
a display processor;
a system memory configured to store a previous picture that is displayed immediately prior to a current picture; and
processing circuitry configured to:
reconstruct at least a portion of a current picture based on pixel values of a previous picture that is displayed immediately prior to the current picture, wherein to reconstruct, the processing circuitry is configured to generate one or more first regions in the current picture by copying pixel values of one or more respective co-located regions in the previous picture that is displayed immediately prior to the current picture;
subsequent to reconstructing the current picture, identify, based on decoding modes that were used for reconstructing the current picture, the one or more first regions in the current picture that were generated by copying the pixel values stored in the system memory of the one or more respective co-located regions in the previous picture that is displayed immediately prior to the current picture;
subsequent to reconstructing the current picture, identify one or more second regions of the current picture that changed relative to the previous picture based on the identified one or more first regions in the current picture; and
provide instructions to the display processor to retrieve pixel values of the identified one or more second regions of the current picture that changed relative to the previous picture from the system memory, and no pixel values for the identified one or more first regions from the system memory, for composing the current picture with one or more layers of image content to generate a composed image.

10. The device of claim 9, wherein the processing circuitry is configured to provide instructions to the display processor to output information used to display the composed image.

11. The device of claim 9, wherein the processing circuitry is configured to:
identify an updating region based on a union of the identified one or more second regions of the current picture that changed relative to the previous picture and respective regions of the one or more layers of image content having image content that changed relative to a previous composed image that is displayed immediately prior to the display of the composed image; and
provide instructions to the display processor to compose the identified updating region.

12. The device of claim 9, wherein the current picture comprises a first picture, and wherein the processing circuitry is configured to:
   determine that an entirety of a second picture was generated by copying pixel values of a third picture that is displayed immediately prior to the second picture;
   in response to determining that the entirety of the second picture was generated by copying pixel values, provide instructions to the display processor to compose the second picture with the one or more layers of image content without retrieving any pixel values for the second picture from the system memory.

13. The device of claim 9, further comprising:
   a layer buffer in the system memory,
   wherein the processing circuitry is configured to:
      provide instructions to the display processor to retrieve pixel values of the identified one or more second regions of the current picture that changed from the layer buffer in the system memory; and
      provide instructions to the display processor to retrieve pixel values of the identified one or more first regions from a local memory of the display processor.

14. The device of claim 9, wherein to identify the one or more first regions in the current picture that were generated by copying pixel values of the one or more respective co-located regions in the previous picture that is displayed immediately prior to the current picture, the processing circuitry is configured to:
   determine that the one or more first regions in the current picture were decoded in a skip mode; and
   determine that a reference picture for the skip mode was the previous picture that is displayed immediately prior to the current picture.

15. The device of claim 9, wherein the processing circuitry includes the display processor.

16. The device of claim 9, wherein the display processor is configured to compose the identified one or more second regions with one or more layers of image content to generate the composed image by stitching the identified one or more second regions with the image content of the one or more layers of image content.

17. The device of claim 9, wherein the device comprises one of:
   a wireless device comprising a display configured to display the composed image;
   an integrated circuit; or
   a microprocessor.

18. A device for composing images for display, the device comprising:
   means for reconstructing at least a portion of a current picture based on pixel values of a previous picture that is displayed immediately prior to the current picture, wherein reconstructing comprises generating one or more first regions in the current picture by copying pixel values of one or more respective co-located regions in the previous picture that is displayed immediately prior to the current picture;
   means for identifying, subsequent to reconstructing the current picture and based on decoding modes that were used for reconstructing the current picture, the one or more first regions in the current picture that were generated by copying the pixel values of the one or more respective co-located regions in the previous picture that is displayed immediately prior to the current picture;
   means for identifying, subsequent to reconstructing the current picture, one or more second regions of the current picture that changed relative to the previous picture based on the identified one or more first regions in the current picture; and
   means for providing instructions to a display processor to retrieve pixel values of the identified one or more second regions of the current picture that changed relative to the previous picture from a system memory, and no pixel values for the identified one or more first regions from the system memory, for composing the current picture with one or more layers of image content to generate a composed image.

19. The device of claim 18, further comprising:
   means for providing instructions to the display processor to output information used to display the composed image.

20. The device of claim 18, further comprising:
   means for identifying an updating region based on a union of the identified one or more second regions of the current picture that changed relative to the previous picture and respective regions of the one or more layers of image content having image content that changed relative to a previous composed image that is displayed immediately prior to the display of the composed image; and
   means for providing instructions to the display processor to compose the identified updating region.

21. The device of claim 18, wherein the means for identifying the one or more first regions in the current picture that were generated by copying pixel values of the one or more respective co-located regions in the previous picture that is displayed immediately prior to the current picture comprises:
   means for determining that the one or more first regions in the current picture were decoded in a skip mode; and
   means for determining that a reference picture for the skip mode was the previous picture that is displayed immediately prior to the current picture.

22. A computer-readable storage medium having instructions stored thereon that when executed cause one or more processors of a device for composing images for display to:
   reconstruct at least a portion of a current picture based on pixel values of a previous picture that is displayed immediately prior to the current picture, wherein the instructions that cause the one or processors to reconstruct comprise instructions that cause the one or more processors to generate one or more first regions in the current picture by copying pixel values of one or more respective co-located regions in the previous picture that is displayed immediately prior to the current picture;
   subsequent to reconstructing the current picture, identify, based on decoding modes that were used for reconstructing the current picture, the one or more first regions in the current picture that were generated by copying the pixel values of the one or more respective co-located regions in the previous picture that is displayed immediately prior to the current picture;
   subsequent to reconstructing the current picture, identify one or more second regions of the current picture that changed relative to the previous picture based on the identified one or more first regions in the current picture; and
   provide instructions to a display processor to retrieve pixel values of the identified one or more second regions of the current picture that changed relative to the previous picture from a system memory, and no pixel values for the identified one or more first regions from the system memory, for composing the current picture with one or more layers of image content to generate a composed image.

23. The computer-readable storage medium of claim 22, further comprising instructions that cause the one or more processors to:

provide instructions to the display processor to output information used to display the composed image.

24. The computer-readable storage medium of claim 22, further comprising instructions that cause the one or more processors to:

identify an updating region based on a union of the identified one or more second regions of the current picture that changed relative to the previous picture and respective regions of the one or more layers of image content having image content that changed relative to a previous composed image that is displayed immediately prior to the display of the composed image; and provide instructions to the display processor to compose the identified updating region.

25. The computer-readable storage medium of claim 22, wherein the instructions that cause the one or more processors to identify the one or more first regions in the current picture that were generated by copying pixel values of the one or more respective co-located regions in the previous picture that is displayed immediately prior to the current picture comprise instructions that cause the one or more processors to:

determine that the one or more first regions in the current picture were decoded in a skip mode; and determine that a reference picture for the skip mode was the previous picture that is displayed immediately prior to the current picture.

* * * * *